(12) United States Patent
Romani

(10) Patent No.: US 7,698,205 B2
(45) Date of Patent: Apr. 13, 2010

(54) COMBINATION LEG PRICE GENERATION

(75) Inventor: Alessandro Romani, Stockholm (SE)

(73) Assignee: OMX Technology AB, Stockholm (SE)

( * ) Notice: Subject to any disclaimer, the term of this patent is extended or adjusted under 35 U.S.C. 154(b) by 2021 days.

(21) Appl. No.: 10/454,833

(22) Filed: Jun. 5, 2003

(65) Prior Publication Data

US 2004/0249740 A1     Dec. 9, 2004

(51) Int. Cl.
G06Q 40/00     (2006.01)
(52) U.S. Cl. .......................................... 705/37; 705/35
(58) Field of Classification Search .................. 705/37
See application file for complete search history.

(56) References Cited

U.S. PATENT DOCUMENTS

| | | | |
|---|---|---|---|
| 7,162,447 B1 * | 1/2007 | Cushing ........................ | 705/37 |
| 2001/0042040 A1 * | 11/2001 | Keith ............................ | 705/37 |
| 2001/0049649 A1 * | 12/2001 | Baecker et al. ................ | 705/37 |
| 2003/0004899 A1 | 1/2003 | Bergenudd | |
| 2003/0200167 A1 * | 10/2003 | Kemp et al. ................... | 705/37 |
| 2004/0064395 A1 * | 4/2004 | Mintz et al. ................... | 705/37 |
| 2005/0160024 A1 * | 7/2005 | Soderborg et al. ............ | 705/37 |

OTHER PUBLICATIONS (ASX) Australian Stock Exchange, Notice to Derivatives Trading & Claering Participants. Derivatives Notice [online]. Australian Stock Exchange Apr. 23, 2002 [retrieved on Nov. 12, 2009]. Retrieved from the Internet: <URL:http://www.asx.com.au/products/pdf/notices/2002/Clm06002.pdf>.*

Declaration of Non-Establishment of International Search Report dated Aug. 13, 2004.

Search and Examination Report issued Aug. 31, 2006 in Singapore Application No. 200507259-0.

* cited by examiner

*Primary Examiner*—Stefanos Karmis
*Assistant Examiner*—Thuan Tran
(74) *Attorney, Agent, or Firm*—Nixon & Vanderhye P.C.

(57) ABSTRACT

A method of calculating leg prices in trading of a combination order on a market having set price rules is provided. The combination order comprises a combination of instruments of at least two different kinds that are traded for a single net price and each kind of instrument is associated with a respective leg price. The method comprises the following steps: a) assigning seed price values to all leg prices but a last leg price; b) calculating the last leg price by means of the assigned seed price values and a net price for the combination order; c) checking whether the last leg price complies with the price rules; d) if the last leg price does not comply with the price rules, modifying the seed price values; and repeating steps c) and d) until the last leg price complies with current price rules or for a predetermined number of times. This attains compliance with the tick step rules and in turn avoids the use of secondary price algorithms, which may lead to costly and time-consuming manual re-booking.

21 Claims, 2 Drawing Sheets

COMBINATION LEG PRICE GENERATION

FIELD OF INVENTION

The present invention relates generally to the generation of leg prices in combination trade and more specifically to the generation of leg prices which comply with the price rules, such as tick step rules for a marketplace.

BACKGROUND

In so-called combination trade a bidder places on the market a single price for a combination of different financial instruments. These individual instruments may be shares, options etc., or any combination thereof. A combination order could for example be "Sell 2 instruments A, buy 3 instruments B for a combination net price of $10".

A combination order is listed as a single instrument on the market. Thus, in order for a combination order to be executed, all the involved instruments must be traded as a single order. This combination instrument could be a or a standard combination defined by the system operator or a so called tailor made combination (TMC) defined by a party trading in the system. The strategy is the specific relation between the different instruments making up the combination, i.e., the ratio between the amount of the respective instruments traded. The number of different instruments, or so-called legs, could vary from two, as in the example above, up to four or even more, although two is the conventional number of legs in a combination order.

When a combination order is executed, the price for the different kinds of instruments traded has to be determined, the so-called leg prices. In the above given example, there is one leg price for the two instruments A and another leg price for the three instruments B. One reason for this need to determine leg prices is because the different instruments could have been traded for different clients of the broker, for example. Another reason could be that that the leg prices should be booked on different accounts.

When determining the leg prices, first the market is looked at and prices are assigned to the different legs. However, in the end it is common to end up with a set of leg prices that does not match the combination net price. Therefore so-called seed price values which are first estimates of the leg prices are used. These seed price values are subsequently modified if required so as to arrive to a set of leg prices that matches the combination price.

One way of finding the seed price values is to look at the current bid and ask prices on the market for the individual instruments and assign the leg prices accordingly in any desired order. In the situation where the market has just opened and there are no orders and there have been no trades on all the series, the seed price value for the last leg will be the theoretical value or default values will be used. The theoretical value is the value of an instrument as determined by a specific model based on the model's input parameters. This could clearly lead to the legs trading at prices totally out of the market. As soon as real orders will be placed on the series and/or trades take place (i.e. a "last paid" exists), the theoretical value will no longer be used as seed price value.

A market maker is a trader responsible for providing quotes. Thus, the market maker is obliged to give an estimated bid or ask price for an instrument on demand. This is another way of finding the seed price values.

In current stock market exchange systems, all calculations are computer generated. In some prior art computer systems, when generating the leg prices for a combination trade, two algorithms are used. First, the "ordinary price algorithm" is used, which tries to use seed price values taken from the market (i.e. bid, ask, theoretical value, last bid or ask etc.). If the ordinary price algorithm for some reason fails, a "secondary price algorithm" is used, which is called when all attempts made by the "ordinary" algorithm fail.

The main difference between the two algorithms is that the latter does not make use of the current market picture to define a seed price value and therefore generates whatever kind of prices that do match the combination net.

When trading combination orders, and particularly tailor made combination orders, a few situations could lead to the legs trading at incorrect prices. In this case incorrect prices do not necessarily mean that the combination net is not matched but that the leg prices are consistent with the market picture but do not comply with the tick step rules, i.e., the rules relating to the minimum price fluctuation available in a marketplace expressed in terms of points, ordinary fractions, or decimal fractions of a point of the price or rate. An example thereof is given in Table 1a below.

TABLE 1a

| Action | Instrument | Ratio | Leg Prices | Net Price | Pay/ Receive |
|---|---|---|---|---|---|
| Buy | A | 8 | 859.0 | | |
| Sell | B | −25 | 0.4 | 6862.0 | Pay | wherein "Action" is either Buy or Sell, "Instrument" is a kind of financial instrument in the respective leg, "Ratio" is the number of instruments traded, "Leg Price" is the price that could be generated by the primary or secondary price algorithm, "Net Price" is the total price set in the order, and "Pay/Receive" indicates whether the Net Price is positive or negative.

An example of tick size rules for instruments A and B is given in Table 1b below. It reports the allowed tick steps for different interval and it also indicates that only one decimal is allowed.

TABLE 1b

| Step size | Lower limit | Upper limit |
|---|---|---|
| 0.1 | 0.1 | 0.9 |
| 0.5 | 1.0 | 49.5 |
| 1 | 50 | 999 |
| 10 | 1000 | 9999999 |

The market picture for the instruments A and B is given in FIG. 1c below.

TABLE 1c

| Instrument | Bid | Ask |
|---|---|---|
| A | 938.0 | 938.0 |
| B | 19.5 | 27.5 |

In the above, example the current theoretical value for the A leg price is 938 and the combination net is 6862. The ordinary algorithm sets the A leg to the theoretical value and calculates the B leg price as follows:

$$B \text{ Leg price} = (8*938 - 6862)/25 = 24.72$$

This price, which is consistent with the market picture, is discarded because the tick step rule allows only one decimal, see FIG. 1b. The result is that the system uses the secondary price algorithm, which will generate trades for 859 for the A leg, i.e., the original leg price, and 0.4 for the B leg. These had to be manually re-booked to e.g. 939 and 26. This adds a further step in the leg price generation, thus introducing associated costs and delays.

It could also be so that legs trade at prices that are too far away from the actual spread on the market. Also in this case the leg prices are usually not compliant with the tick step rules.

Thus, a first problem in prior art systems is that the calculated leg prices do not comply with the tick step rules. This in turn results in that the system is forced to use the secondary price algorithm.

The second problem is a result of the use of the secondary algorithm as all the attempts made by the ordinary one have failed to find valid prices. Whenever the "ordinary" algorithm fails and the secondary price algorithm is called prices that are totally unrelated to the market picture could be generated, as long as the combination net price is matched. This is done in order to make the trade possible. The "incorrect" leg prices will then need to be re-booked manually by the market control to more appropriate prices.

When calling the secondary algorithm usually no checks are made that the generated prices are compliant with the allowed tick steps but the system only checks that the prices have the correct number of decimals.

SUMMARY

The present invention aims at eliminating or at least mitigating the problems associated with prior art system. An object is thus to provide a method of calculating leg prices in combination orders wherein the leg prices are made to comply with current tick step rules. Another object is to provide a method of calculating leg prices in combination orders wherein the leg prices closely relate to the market picture.

The technology is based on the realisation that the seed price values used in the ordinary algorithm can be modified so as to arrive at leg prices that comply with the tick step rules. It has surprisingly been found that by replacing the original seed price value with seed price values being one or a few tick steps away from the original seed price value, the number of combination trades that have to be manually rebooked is dramatically reduced. By using this method the step of using the secondary algorithm is avoided, thus improving the result in regard to the market picture.

According to a first aspect there is provided a method of calculating leg prices in trading of a combination order on a market having set price rules, wherein said combination order comprises a combination of instruments of at least two different kinds that are traded for a single net price, and wherein each kind of instrument is associated with a respective leg price, said method comprising the following steps: a) assigning seed price values to all leg prices but a last leg price; b) calculating said last leg price by means of said assigned seed price values and a net price for the combination order; c) checking whether said last leg price complies with the price rules; d) if said last leg price does not comply with the price rules, modifying said seed price values; and repeating steps c) and d) until said last leg price complies with current price rules or for a predetermined number of times.

According to a second aspect there is provided a computer program product directly loadable into the internal memory of a computer terminal for performing the method according to the invention.

Thus there is provided a method of calculating leg prices in trading of a combination order on a market having set price rules wherein the leg prices comply with the tick step rules. This in turn avoids the use of secondary price algorithms, thereby avoiding manual re-booking.

DETAILED DESCRIPTION

In the following a detailed description of preferred example embodiments will be given, wherein the following definitions will be used:

Seed price value—the value that is initially set for a single financial instrument in a combination order.

Leg price value—the final calculated value for a single instrument in a combination order.

Total leg price value—the final calculated value for one leg in a combination order, i.e., the leg price value times the number of that kind of instrument traded.

Net price value—the sum for which a combination order is traded.

Figure 1:
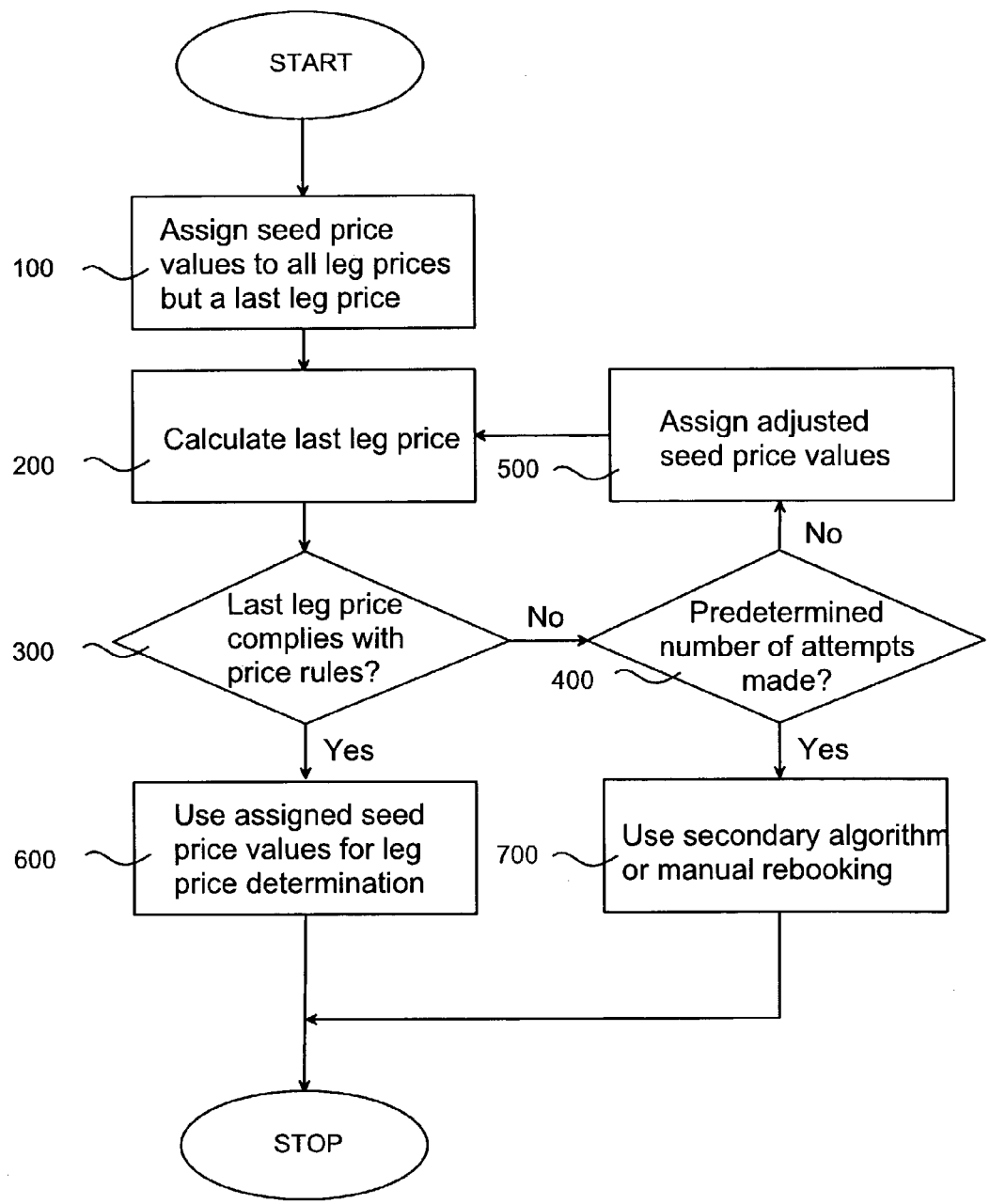
FIG. 1 is a flow chart describing a general method.

First, the general concept will be explained with reference to FIG. 1, which is a flow chart of the inventive method applicable on a combination order, such as the one described in the background section with reference to Table 1a.

Initially, in step 100, seed price values are assigned to all leg prices but one of the combination order. These seed price values can be based on any relevant available information, such as current market bid or ask values, a theoretical value etc. Thus, by this all leg price values but one are assigned in compliance with the tick step rules.

Then, in step 200, the leg price value for the instrument that has not yet been assigned a seed price value is then calculated as follows. The total leg price value is calculated for all legs but the one that has not been assigned a seed price value. The sum of all other total leg price values is subtracted from the net price value and the result is divided by the number of instruments not assigned a seed price. The result is the leg price value for the last leg.

In step 300 it is checked whether the leg price value of the last leg as calculated in step 200 complies with current tick step rules. These rules could for example determine the number of decimals used, the tick step for different value ranges etc. If the last leg price complies with the rules, the assigned seed price values are used for the leg price determination in step 600 and the algorithm then ends. However, if the leg price value of the last leg does not comply with current tick step rules, in step 400 it is checked whether a predetermined number of attempts have been made. If not, in step 500 one or more of the set seed price values are modified according to predetermined rule that will be described further below. Steps 200-500 are then repeated until the last leg price value complies with current price rules or the predetermined number of attempts have been made. If, after this number of attempts, no valid last leg price value has been found, an alternative way of finding the last leg price value is used in step 700, such as by a secondary algorithm or by manual input.

Some examples of the inventive method will now be described. In these examples, several attempts are made around the selected seed price values. Thus, in a preferred embodiment, the method shall try not only at the selected seed price value, but also +/−1 tick step and alternatively also at +/−2 tick steps away from the current seed price value. It can be shown that the number of combination trades that need to be manually re-booked will then be dramatically reduced. The actual number of attempts is determined by a configuration file stored in the automatic trade system executing the inventive method.

On one hand it is desirable to try as many seed price values as possible so as to increase the possibility to arrive at leg price values that comply with both the tick step rules and the market values. On the other hand the seed price values should not deviate too much from the original seed prices value. Also, too many attempts would slow down the system executing the calculation. It is hence a trade-off between accuracy and efficiency. Also, it is desirable that there is a limit to the seed price values that can be set, i.e. 4, and if the value exceeds this limit the system will reject the value, log this in a log file and assume a default value of 2 instead.

In a first instance, the algorithm rejects solutions found for the leg prices if these are not compliant with the tick step rules and do more attempts. If the algorithm fails to find correct leg price values within the predetermined number of attempts, it is preferred that it returns to the first solution found, even if that is not compliant with the tick step rules. If, in the previous attempts, no such a solution was found, it shall proceed by calling a secondary price determination algorithm.

Thus, if the seed adjustment value is set to 1, the system tries with 3 different seed price values: seed price, then seed price value+1 tick step and finally seed price value−1 tick step. If all attempts with these seed price values fail, a secondary price determination algorithm will be called. If the seed adjustment value is set to 2, the system shall try with 5 different prices: seed price, seed price+1 tick step, seed price−1 tick, seed price+2 tick steps and seed price−2 tick steps. If all attempts with these seed price values fail, a secondary price determination algorithm will be called, etc.

In the preferred embodiment, the default seed adjustment value is 2. That is, a maximum of 5 seed prices will be generated for each leg of the combination order.

The above described basic algorithm can be further enhanced. Assume that the seed adjustment value is 2. Depending on the nature of the selected seed price values, i.e., how the seed price value has been determined, different adjusted seed price values are used according to the following.

If the seed is based on the theoretical value or the last paid value, then the ordinary algorithm is allowed to make the following attempts, if needed:
1) initial seed price value, i.e., the theoretical value or the last paid value;
2) seed price+1 tick step;
3) seed price−1 tick step;
4) seed price+2 tick steps;
5) seed price−2 tick steps.

This means that apart from the first value of the seed (the theoretical value) the algorithm will try also with +/−1 and +/−2 tick steps away from it.

However, if the seed price value is based on a bid order, the algorithm shall be allowed to make the following attempts, if needed:
1) seed price value (bid order)+1 tick step;
2) seed price value+2 tick steps, but only if not bigger than the ask side, if any;
3) seed price value+3 tick steps, but only if not bigger than the ask side, if any.

This is done in order to ensure that a seed is within the spread, i.e., the values ranging from the current bid value to the current ask value on the market. This means that apart from the first value of the seed (bid+1 tick step) the algorithm will try also with +1 and +2 tick steps away from it.

If these attempts fail, the algorithm also tries with the seed price value being equal to the bid order, without incrementing it.

Finally, if the seed price value is based on a ask order, the algorithm shall be allowed to make the following attempts, if needed:
1) seed price value (ask order)−1 tick step;
2) seed price value−2 tick steps, only if not smaller than the bid side, if any;
3) seed price value−3 tick steps, only if not smaller than the bid side, if any.

Also in this case this is done in order to ensure that a seed is within the spread. This means that apart from the first value of the seed (ask−1 tick step) the algorithm will try also with −1 and −2 tick steps away from it.

If these attempts fail, the algorithm also tries with the seed price value being equal to the ask order, without decrementing it.

As the number of attempts in generating leg prices has a direct impact on the performances of the system. It is presently preferred that it is not be allowed to set a seed adjustment value larger than 4. It is preferred that if the seed adjustment value by any chance is set to a value larger than 4, the system shall discard the value and set the parameter to a default value of 2 and log this change.

A number of examples using the above described enhanced algorithms will now be given, first with reference to the example given in the background section. Tables 1a-c are repeated here for convenience.

TABLE 1a

| Action | Instrument | Ratio | Leg Prices | Net Price | Pay/Receive |
|---|---|---|---|---|---|
| Buy | A | 8 | 859 | | |
| Sell | B | −25 | 0.4 | 6862.0 | |

The allowed tick step is given in FIG. 1b below.

TABLE 1b

| Step size | Lower limit | Upper limit |
|---|---|---|
| 0.1 | 0.1 | 0.9 |
| 0.5 | 1.0 | 49.5 |
| 1 | 50 | 999 |
| 10 | 1000 | 9999999 |

The market picture for the instruments A and B is given in FIG. 1c below.

TABLE 1c

| Instrument | Bid | Ask |
|---|---|---|
| A | 938.0 | 938.0 |
| B | 19.5 | 27.5 |

As already explained, prior art methods would lead to invalid leg price value for instrument B. However, if the enhanced method is used, wherein the seed price values will be based on the theoretical value, it is not possible to get a correct price for the B leg. Instead of calling the secondary algorithm, the seed price value of A is adjusted, complying with the tick step rule for this price range equal to 1. The seed price value is thus increased by 1 tick step to 938+1=939. By assigning the leg A seed price value this value, the leg B price value would be calculated as follows:

(6862.0−(8*939))/25=26.0

The inventive algorithm will thus arrive at the solution reported as in the original manual rebook described in the background section.

In a second example, the combination order is the same but the other parameters, i.e., theoretical values, the net price, and the market values have changed, see Tables 2a and 2b below.

TABLE 2a

| Action | Instrument | Ratio | Leg Prices | Net Price | Pay/Receive |
|---|---|---|---|---|---|
| Buy | A | 8 | 862.5 | | |
| Sell | B | −25 | 0.8 | 6880.0 | Pay |

TABLE 2b

| Instrument | Bid | Ask |
|---|---|---|
| A | 936.0 | 936.0 |
| B | 19.0 | 27.5 |

Prior art methods would arrive at a leg A seed price value of 936.0, complying with the tick step rules, but at a leg B price value of 24.4, not complying with the tick steps for that value range (tick step=0.5).

The algorithm first adjusts the leg A seed price value by +1 tick step, i.e., by +1 for that price range, to an adjusted value of 937.0. This results in the algorithm generating the following leg B price value:

(6880.0−(8*937))/25=24.64

This clearly leads to a leg B price value that does not comply with the tick step rules.

By then adjusting the leg A seed price value by −1 tick step from the original seed price value, the algorithm generates the following leg B price value:

(6880.0−(8*935))/25=24.0

This is an example where the system managed to generate correct prices after just two seed price value adjustments.

In some cases the inventive method results in values that are not compliant with the tick step rules. In these cases the algorithm shall roll back to the first result found. In this case we still provide a leg price value that is not compliant with the tick step rule but at least the enhanced price algorithm has not been called.

In the examples given above, the combination orders only contain two legs, A and B. With the inventive algorithm, one of the legs is assigned a seed price value and the leg price value of the other leg is calculated accordingly. However, the inventive method is not limited to combination orders comprising just two legs. If there are more than two legs, all of the legs but one are assigned seed price values and the leg price value of the last leg is calculated. If this leg price value is invalid, the different seed price values can be adjusted in many ways. One seed value can be adjusted at the time. If this fails to generate a valid last leg price value, several seed values can be adjusted simultaneously, generating a vast number of possible combinations. The way the seed values are adjusted is thus a trade-off between accuracy and performance.

Figure 2:
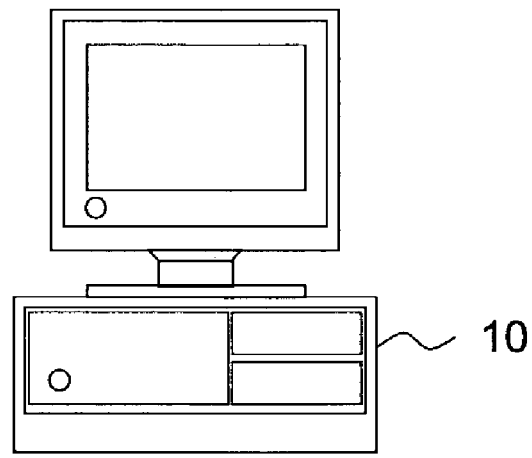
FIG. 2 shows a system arranged for performing the method.
Figure 3:
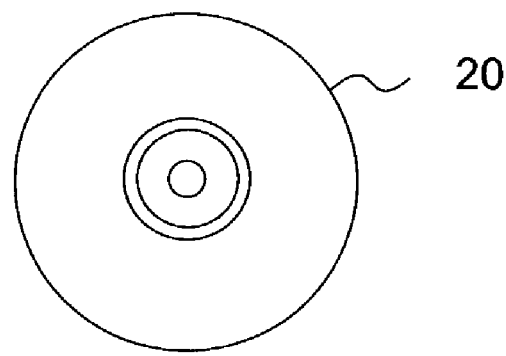
FIG. 3 shows a data carrier for storing a computer program product with software code portions for executing the method.

Finally, FIG. 2 illustrates a system 10 comprising a computer, in which an automatic trade system according to the present invention is implemented, and FIG. 3 illustrates a storage medium 20, which stores a computer program product for performing any of the methods described.

By using the inventive method, it is possible to get the duplicated benefit of reducing the need for calling a secondary price algorithm and the generation of leg price values compliant with current tick step rules.

Preferred example embodiments of a method, a system, and a computer program product have been described. A person skilled in the art realises that these could be varied within the scope of the appended claims.

The invention claimed is:

1. A method implemented in a trade matching system, comprising:
    a) the trade matching system calculating leg prices in trading of a combination order that has been matched in the trade matching system on a market having set price rules, wherein said combination order comprises a combination of instruments of at least two different kinds that are traded for a single net price, and wherein each kind of instrument is associated with a respective leg price, the method comprising the following further steps:
    b) for said matched combination order, the trade matching system assigning seed price values to all leg prices but a last leg price;
    c) calculating said last leg price based on said assigned seed price values and a net price for the combination order;
    d) checking whether said last leg price complies with the price rules;
    e) determining that said last leg price does not comply with the price rules, and based on that determination, the trade matching system modifying one or more of said seed price values; and
    f) the trade matching system repeating steps c)-d) with the modified one or more seed price values until said last leg price complies with the price rules or for a predetermined number of times.

2. The method according to claim 1, wherein the price rules include tick size or tick spread rules, and wherein, in step e), said seed price values are modified by a number of tick steps away from said seed price values assigned in step b).

3. The method according to claim 2, wherein, in step e), said seed price values are modified by +/−1 tick step away from said seed price values assigned in step b).

4. The method according to claim 3, wherein, in step e), said seed price values are modified by +/−2 tick steps away from said seed price values assigned in step b).

5. The method according to claim 1, comprising the additional step of returning to a first solution found if steps c)-e) have been repeated the predetermined number of times.

6. The method according to claim 1, wherein said predetermined number of times is 2.

7. The method according to claim 1, wherein said predetermined number of times is 4.

8. The method according to claim 1, wherein, in step b), seed price values are assigned based on a bid value.

9. The method according to claim 8, wherein, in step b), seed price values are assigned to a bid value+1 tick step.

10. The method according to claim 9, wherein, in step e), said seed price values are modified in the following order:
    seed price assigned in step a) +1 tick step, but only if not bigger than an ask side; and
    seed price assigned in step a) +2 tick steps, but only if not bigger than an ask side.

11. The method according to claim 1, wherein, in step b), seed price values are assigned based on an ask value.

12. The method according to claim 11, wherein, in step b), seed price values are assigned to an ask value−1 tick step.

13. The method according to claim 12, wherein, in step e), said seed price values are modified in the following order:
   seed price assigned in step b) −1 tick step, but only if not smaller than a bid side; and
   seed price assigned in step b) −2 tick steps, but only if not smaller than a bid side.

14. The method according to claim 1, wherein, in step b), seed price values are assigned based on either of a theoretical value or a last paid value.

15. The method according to claim 14, wherein, in step e), said seed price values are modified in the following order:
   seed price assigned in step b) +1 tick step;
   seed price assigned in step b) −1 tick step;
   seed price assigned in step b) +2 tick steps; and
   seed price assigned in step b) −2 tick steps.

16. The method according to claim 1, wherein in step c) said last leg price is calculated by summing the leg price times a number of that kind of instrument and dividing the result by the number of instruments not assigned a seed price.

17. The method according to claim 1, wherein said price rules comprises rules regarding a number of decimals used or the tick step for different value ranges.

18. An automatic trade matching system, said automatic trade matching system including a data processor and a memory arranged to perform the following steps for a combination order matched on a market having set price rules:
   a) calculating at the trade matching system leg prices for the matched combination order, wherein said combination order comprises a combination of instruments of at least two different kinds that are traded for a single net price, and wherein each kind of instrument is associated with a respective leg price, the data processor and a memory further arranged to perform the following steps for said matched combination order:
   b) assigning seed price values at the trade matching system to all leg prices but a last leg price;
   c) calculating said last leg price based on said assigned seed price values and a net price for the combination order;
   d) checking whether said last leg price complies with the price rules;
   e) determining that said last leg price does not comply with the price rules, and based on that determination, modifying one or more of said seed price values; and
   f) repeating steps c)-e) with the modified one or more seed price values until said last leg price complies with the price rules or for a predetermined number of times.

19. A computer program product loadable into the internal memory of a computer, said product having software code portions which when executed cause the computer to perform the following steps for a combination order matched on a market having set price rules:
   a) calculating leg prices for the matched combination order, wherein the matched combination order includes a combination of instruments of at least two different kinds that are traded for a single net price, and wherein each kind of instrument is associated with a respective leg price;
   b) assigning seed price values at the trade matching system to all leg prices but a last leg price;
   c) calculating said last leg price based on said assigned seed price values and a net price for the combination order;
   d) checking whether said last leg price complies with the price rules;
   e) determining that said last leg price does not comply with the price rules, and based on that determination, modifying one or more of said seed price values; and
   f) repeating steps c)-e) with the modified one or more seed price values until said last leg price complies with the price rules or for a predetermined number of times.

20. The automatic trade matching system in claim 18, wherein the price rules include tick size or tick spread rules.

21. The automatic trade matching system in claim 18, wherein the price rules include tick size or tick spread rules.

* * * * *